(12) United States Patent
Zhao

(10) Patent No.: US 7,590,628 B2
(45) Date of Patent: Sep. 15, 2009

(54) DETERMINING DOCUMENT SUBJECT BY USING TITLE AND ANCHOR TEXT OF RELATED DOCUMENTS

(75) Inventor: Shubin Zhao, Jersey City, NJ (US)

(73) Assignee: Google, Inc., Mountain View, CA (US)

( * ) Notice: Subject to any disclaimer, the term of this patent is extended or adjusted under 35 U.S.C. 154(b) by 261 days.

(21) Appl. No.: 11/394,610

(22) Filed: Mar. 31, 2006

(65) Prior Publication Data

US 2007/0240031 A1 Oct. 11, 2007

(51) Int. Cl.
G06F 17/00 (2006.01)
(52) U.S. Cl. .......................................... 707/6; 715/205
(58) Field of Classification Search ................ 715/205; 707/6
See application file for complete search history.

(56) References Cited

U.S. PATENT DOCUMENTS

| | | | | |
|---|---|---|---|---|
| 5,475,819 A | 12/1995 | Miller et al. | ................ | 709/203 |
| 5,560,005 A | 9/1996 | Hoover et al. | ................ | 707/10 |
| 5,574,898 A | 11/1996 | Leblang et al. | ................ | 707/1 |
| 6,122,647 A * | 9/2000 | Horowitz et al. | ............ | 715/205 |
| 6,572,661 B1 * | 6/2003 | Stern | ........................ | 715/203 |
| 2003/0154071 A1 | 8/2003 | Shreve | .......................... | 704/9 |
| 2004/0107125 A1 | 6/2004 | Guheen et al. | ................. | 705/7 |
| 2006/0074910 A1 * | 4/2006 | Yun et al. | ...................... | 707/7 |
| 2007/0130123 A1 * | 6/2007 | Majumder | ..................... | 707/3 |

OTHER PUBLICATIONS

Brill, E. et al., "An Analysis of the AskMSR Question-Answering System," Proceedings of the Conference on Empirical Methods in Natural Language Processing (EMNLP), Jul. 2002, pp. 257-264.
Brin, S., "Extracting Patterns and Relations from the World Wide Web," 12 pages.
Chang, C. et al., "IEPAD: Information Extraction Based on Pattern Discovery," WWW10 '01, ACM, May 1-5, 2001, pp. 681-688.
Chu-Carroll, J. et al., "A Multi-Strategy with Multi-Source Approach to Question Answering," 8 pages.
Dean, J. et al., "MapReduce: Simplified Data Processing on Large Clusters," To appear in OSDI 2004, pp. 1-13.
Etzioni, O. et al., "Web-scale Information Extraction in KnowItAll (Preliminary Results)," WWW2004, ACM, May 17-20, 2004, 11 pages.

(Continued)

*Primary Examiner*—Christian P. Chace
*Assistant Examiner*—Kellye D Buckingham
(74) *Attorney, Agent, or Firm*—Morgan, Lewis & Bockius LLP

(57) ABSTRACT

A system and method identifies a subject for a source document. The system and method identifies a collection of peer documents from the same domain as the source document. For each of the peer documents, a collection of linking documents containing a hyperlink to the peer document is identified. For each of the peer documents, a label is generated by choosing the longest-match anchor text of the linking documents. A pattern between the labels and the titles of the collection of peer documents is deduced. The subject of the source document is identified by applying the pattern to the title of the source document.

14 Claims, 9 Drawing Sheets

OTHER PUBLICATIONS

Freitag, D. et al., "Boosted Wrapper Induction," American Association for Artificial Intelligence, 2000, 7 pages.

Guha, R. et al., "Disambiguating People in Search," WWW2004, ACM, May 17-22, 2004, 9 pages.

Guha, R., "Object Co-identification on the Semantic Web," WWW2004, ACM, May 17-22, 2004, 9 pages.

Hogue, A.W., "Tree Pattern Inference and Matching for Wrapper Induction on the World Wide Web," Master of Engineering in Electrical Engineering and Computer Science, Massachusetts Institute of Technology, Jun. 2004, pp. 1-106.

"Information Entropy—Wikipedia, the free encyclopedia," [online] [Retrieved on May 3, 2006] Retrieved from the Internet<URL:http://en.wikipedia.org/wiki/Information_entropy>.

"Information Theory—Wikipedia, the free encyclopedia," [online] [Retrieved on May 3, 2006] Retrived from the Internet<URL:http://en.wikipedia.org/wiki/information_theory>.

Jones, R. et al., "Bootstrapping for Text Learning Tasks," 12 pages.

Kosseim, L, et al., "Answer Formulation for Question-Answering," 11 pages.

Liu, B. et al., "Mining Data Records in Web Pages," Conference '00, ACM, 2000, pp. 1-10.

McCallum, A. et al., "Object Consolodation by Graph Partitioning with a Conditionally-Trained Distance Metric," SIGKDD '03, ACM, Aug. 24-27, 2003, 6 pages.

Mihalcea, R. et al., "PageRank on Semantic Networks, with Application to Word Sense Disambiguation," 7 pages.

Mihalcea, R. et al., "TextRank: Bringing Order into Texts," 8 pages.

PCT International Search Report and Written Opinion, PCT/US06/07639, Sep. 13, 2006, 6 pages.

Prager, J. et al., "IBM's PIQUANT in TREC2003," 10 pages.

Prager, J. et al., "Question Answering using Constraint Satisfaction: QA-by-Dossier-with-Constraints," 8 pages.

Ramakrishnan, G. et al., "Is Question Answering an Acquired Skill?", WWW2004, ACM, May 17, 2004, pp. 111-120.

\* cited by examiner

Example Format of Facts in Repository (each fact is associated with an object ID)

Example Facts in Repository (each
fact is associated with an object ID)

Example Object
Reference Table**

Example Format of Facts in Repository (each fact is associated with an object ID)

Example Objects

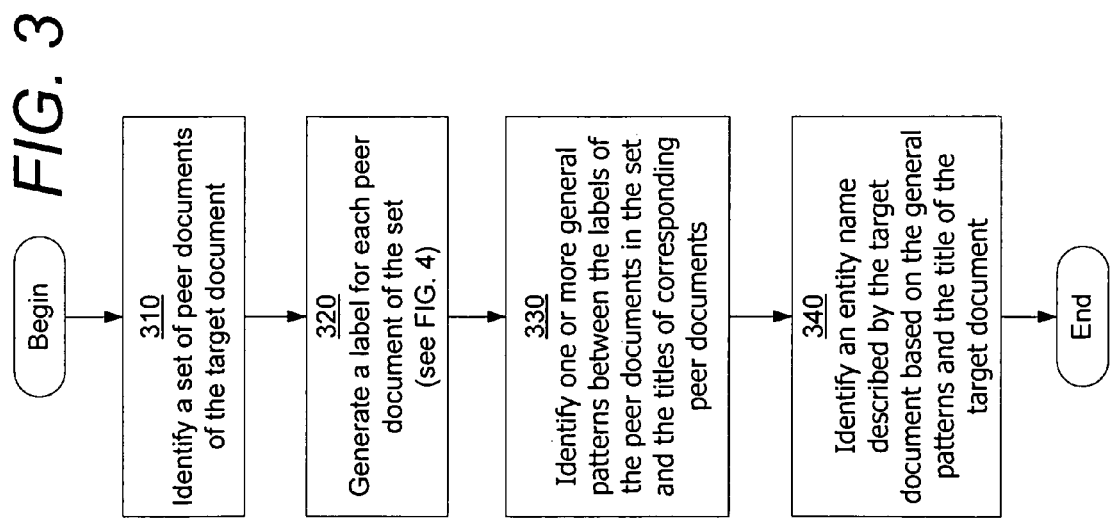

FIG. 6(a)

| Peer Document ID | URL | Peer Document Title |
|---|---|---|
| D1 | www.cnn.com | CNN.com – Breaking News, U.S., World, Weather, Entertainment & Video News |
| D2 | http://www.cnn.com/CNN/anchors_reporters/westhoven.jennifer.html | CNN Programs – Anchors/Reporters – Jennifer Westhoven |
| D3 | http://www.cnn.com/CNN/anchors_reporters/vandillen.bob.html | CNN Programs – Anchors/Reporters – Bob Van Dillen |
| D4 (Target Document) | www.cnn.com/CNN/anchors_reporters/grace.nancy.html | CNN Programs – Anchors/Reporters – Nancy Grace |

FIG. 6(b)

| Linking Document ID | Peer Document ID | Peer Document Title | Anchor Text |
|---|---|---|---|
| D5 | D1 | CNN.com – Breaking News, U.S., World, Weather, Entertainment & Video News | CNN |
| D6 | D1 | CNN.com – Breaking News, U.S., World, Weather, Entertainment & Video News | CNN.com |
| D5 | D2 | CNN Programs – Anchors/Reporters – Jennifer Westhoven | Reporter Jennifer Westhoven |
| D7 | D2 | CNN Programs – Anchors/Reporters – Jennifer Westhoven | Westhoven, Jennifer |
| D8 | D3 | CNN Programs – Anchors/Reporters – Bob Van Dillen | best reporter of CNN |
| D9 | D3 | CNN Programs – Anchors/Reporters – Bob Van Dillen | Bob Van Dillen |
| D10 | D4 (Target Document) | CNN Programs – Anchors/Reporters – Nancy Grace | Grace |
| D11 | D4 (Target Document) | CNN Programs – Anchors/Reporters – Nancy Grace | Nancy Grace |

FIG. 6(c)

| Peer Document ID | Peer Document Title | Label | Individual Pattern |
|---|---|---|---|
| D1 | CNN.com – Breaking News, U.S., World, Weather, Entertainment & Video News | CNN.com | %% && % – Breaking News, U.S., World, Weather, Entertainment & Video News% |
| D2 | CNN Programs – Anchors/Reporters – Jennifer Westhoven | | |
| D3 | CNN Programs – Anchors/Reporters – Bob Van Dillen | Bob Van Dillen | %CNN Programs – Anchors/Reporters – % && %% |
| D4 (Target Document) | CNN Programs – Anchors/Reporters – Nancy Grace | Nancy Grace | %CNN Programs – Anchors/Reporters – % && %% |

General Pattern: %CNN Programs – Anchors/Reporters – %

DETERMINING DOCUMENT SUBJECT BY USING TITLE AND ANCHOR TEXT OF RELATED DOCUMENTS

CROSS-REFERENCE TO RELATED PATENT APPLICATIONS

This application is related to the following U.S. Applications all of which are incorporated by reference herein:

U.S. application Ser. No. 11/366,162, entitled "Generating Structured Information," filed Mar. 1, 2006, by Egon Pasztor and Daniel Egnor;

U.S. application Ser. No. 11/357,748, entitled "Support for Object Search", filed Feb. 17, 2006, by Alex Kehlenbeck, Andrew W. Hogue;

U.S. application Ser. No. 11/342,290, entitled "Data Object Visualization", filed on Jan. 27, 2006, by Andrew W. Hogue, David Vespe, Alex Kehlenbeck, Mike Gordon, Jeffrey C. Reynar, David Alpert;

U.S. application Ser. No. 11/342,293, entitled "Data Object Visualization Using Maps", filed on Jan. 27, 2006, by Andrew W. Hogue, David Vespe, Alex Kehlenbeck, Mike Gordon, Jeffrey C. Reynar, David Alpert;

U.S. application Ser. No. 11/356,679, entitled "Query Language", filed Feb. 17, 2006, by Andrew W. Hogue, Doug Rohde, U.S. application Ser. No. 11/356,837, entitled "Automatic Object Reference Identification and Linking in a Browseable Fact Repository", filed Feb. 17, 2006, by Andrew W. Hogue;

U.S. application Ser. No. 11/356,851, entitled "Browseable Fact Repository", filed Feb. 17, 2006, by Andrew W. Hogue, Jonathan T. Betz;

U.S. application Ser. No. 11/356,842, entitled "ID Persistence Through Normalization", filed Feb. 17, 2006, by Jonathan T. Betz, Andrew W. Hogue;

U.S. application Ser. No. 11/356,728, entitled "Annotation Framework", filed Feb. 17, 2006, by Tom Richford, Jonathan T. Betz;

U.S. application Ser. No. 11/341,069, entitled "Object Categorization for Information Extraction", filed on Jan. 27, 2006, by Jonathan T. Betz;

U.S. application Ser. No. 11/356,838, entitled "Modular Architecture for Entity Normalization", filed Feb. 17, 2006, by Jonathan T. Betz, Farhan Shamsi;

U.S. application Ser. No. 11/356,765, entitled "Attribute Entropy as a Signal in Object Normalization", filed Feb. 17, 2006, by Jonathan T. Betz Vivek Menezes;

U.S. application Ser. No. 11/341,907, entitled "Designating Data Objects for Analysis", filed on Jan. 27, 2006, by Andrew W. Hogue, David Vespe, Alex Kehlenbeck, Mike Gordon, Jeffrey C. Reynar, David Alpert;

U.S. application Ser. No. 11/342,277, entitled "Data Object Visualization Using Graphs", filed on Jan. 27, 2006, by Andrew W. Hogue, David Vespe, Alex Kehlenbeck, Mike Gordon, Jeffrey C. Reynar, David Alpert;

U.S. application Ser. No. 11/394,508 entitled "Entity Normalization Via Name Normalization", filed on Mar. 31, 2006, by Jonathan T. Betz.

U.S. application Ser. No. 11/394 552entitled "Anchor Text Summarization for Corroboration", filed on Mar. 31, 2006, by Jonathan T. Betz and Shubin Zhao. U.S. application Ser. No. 11/394,414, entitled "Unsupervised Extraction of Facts", filed on Mar. 31, 2006, by Jonathan T. Betz and Shubin Zhao.

TECHNICAL FIELD

The disclosed embodiments relate generally to fact databases. More particularly, the disclosed embodiments relate to identifying a subject of a source document.

BACKGROUND

As computers and networks gain popularity, web-based computer documents ("documents") become a vast source of factual information. Users may look to these documents to get answers to factual questions, such as "what is the capital of Poland" or "what is the birth date of George Washington." The factual information included in these documents may be extracted and stored in a fact database.

When extracting facts, it is useful to know the subject with which a document is associated, because any facts extracted from the document are more likely than not associated with the same subject. If the subject is not known, not only are the extracted facts less useful, but organization and management of the extracted facts in the fact database may become more complicated.

One conventional approach to identifying the subject of a document is to select the document title as the subject. A document title ("title") is a general or descriptive heading for a document. A document can have more than one title. For example, a document written in the Hypertext Markup Language (HTML) can have an HTML title, which is the text between two markup tags <TITLE> and </TITLE>. A document may also have a metadata title in the associated HTML metadata, a title as reflected in the associated file name (e.g., a document named conference memo.doc has a title conference memo), and a title in the document content (e.g., the title of this document is Determining Document Subject by Using Title and Anchor Text of Related Documents).

This approach of using the title as the document subject is inadequate. Some documents do not have a subject, while some other documents have multiple subjects (e.g., a webpage entitled Some Random Thoughts). For documents without a subject or with multiple subjects, the document title apparently should not be used as document subject. Also, a document title may not reflect the subject of the document because the author may use the title for purposes such as advertising. For example, an online news agency may universally set all titles of its documents to be The world's most trustworthy news source! Even if the author intends the title to be the subject of the document, the title may still contain unrelated information. For example, in a document titled CNN.com—Oscar Awards 2006, the first section of the title (CNN.com—) serves as advertising for the publisher—CNN.com, and is not related to the subject of the document.

Another conventional approach to identifying the subject of a document is to extract the subject from the document content. This approach is insufficient for human editors because the vast volume of documents and the fast growing speed makes it impractical for human editors to perform the task in any meaningful scale. This approach is also insufficient for computers because in order to properly extract the subject from the content of a document, a computer must process and understand the content. A document may include any machine-readable data including any combination of text, graphics, multimedia content, and so on, making such determination even harder.

For these reasons, what is needed is a method and system that identifies a subject for a source document.

SUMMARY

The invention is a system and method for identifying a subject for a source document. A collection of peer documents from the same domain as the source document are identified. For each of the identified peer documents, a collection of linking documents containing a hyperlink to the identified peer document is identified. For each of the linking documents, the anchor text associated with the hyperlink is identified. A label for the identified peer document is generated based on a longest-match anchor text of the associated linking documents. One or more patterns between the labels and the titles of the collection of peer documents are identified. A subject of the source document is identified by applying the identified patterns to the title of the source document.

These features and benefits are not the only features and benefits of the invention. In view of the drawings, specification, and claims, many additional features and benefits will be apparent.

BRIEF DESCRIPTION OF THE DRAWINGS

FIG. 3 is a flowchart of an exemplary method for identifying a subject for a target document in accordance with a preferred embodiment of the invention.

FIG. 4 is a simplified diagram illustrating a process to generate a label for each of a set of peer documents in accordance with a preferred embodiment of the invention.

FIG. 5 and FIGS. 6(a)-(c) illustrate an example of identifying a subject for a target document, in accordance with a preferred embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

System Architecture

Figure 1:
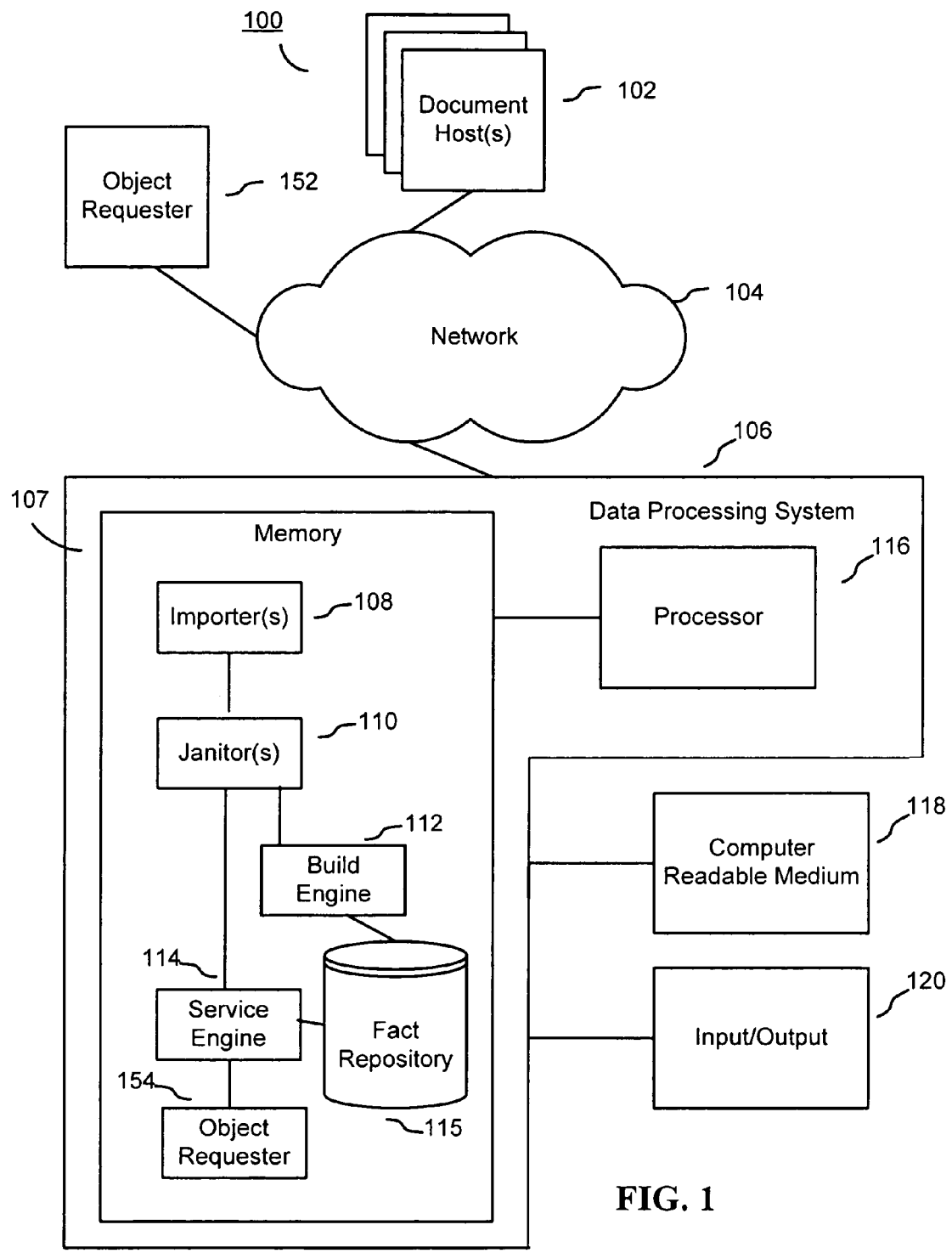
FIG. 1 shows a network, in accordance with a preferred embodiment of the invention.

FIG. 1 shows a system architecture 100 adapted to support one embodiment of the invention. FIG. 1 shows components used to add facts into, and retrieve facts from a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), i.e., a web page, in an interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, Java). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the fact repository 115. In one embodiment, there are different types of importers 108 for different types of documents, for example, dependent on the format or document type.

Janitors 110 operate to process facts extracted by importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "12/2/1981" while on another page that her date of birth is "December. 2, 1981." Birthday and Date of Birth might both be rewritten as Birthdate by one janitor and then another janitor might notice that Dec. 12/2/1981 and December 2, 1981 are different forms of the same date. It would choose the preferred form, remove the other fact and combine the source lists for the two facts. As a result when you look at the source pages for this fact, on some you'll find an exact match of the fact and on others text that is considered to be synonymous with the fact.

Build engine 112 builds and manages the repository 115. Service engine 114 is an interface for querying the repository 115. Service engine 114's main function is to process queries, score matching objects, and return them to the caller but it is also used by janitor 110.

Repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

Repository 115 contains one or more facts. In one embodiment, each fact is associated with exactly one object. One implementation for this association includes in each fact an object ID that uniquely identifies the object of the association. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in repository 115 are described below, in relation to FIGS. 2(a)-2(d).

It should be appreciated that in practice at least some of the components of the data processing system 106 will be distributed over multiple computers, communicating over a network. For example, repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on data processing system 106 instead of being coupled to data processing system 106 by a network. For example, importer 108 may import facts from a database that is a part of or associated with data processing system 106.

FIG. 1 also includes components to access repository 115 on behalf of one or more object requesters 152, 154. Object requesters are entities that request objects from repository 115. Object requesters 152, 154 may be understood as clients of the system 106, and can be implemented in any computer device or architecture. As shown in FIG. 1, a first object requester 152 is located remotely from system 106, while a second object requester 154 is located in data processing system 106. For example, in a computer system hosting a blog, the blog may include a reference to an object whose facts are in repository 115. An object requester 152, such as a browser displaying the blog will access data processing system 106 so that the information of the facts associated with the object can be displayed as part of the blog web page. As a second example, janitor 110 or other entity considered to be part of data processing system 106 can function as object requester 154, requesting the facts of objects from repository 115.

FIG. 1 shows that data processing system 106 includes a memory 107 and one or more processors 116. Memory 107 includes importers 108, janitors 110, build engine 112, service engine 114, and requester 154, each of which are preferably implemented as instructions stored in memory 107 and executable by processor 116. Memory 107 also includes repository 115. Repository 115 can be stored in a memory of one or more computer systems or in a type of memory such as a disk. FIG. 1 also includes a computer readable medium 118 containing, for example, at least one of importers 108, janitors 110, build engine 112, service engine 114, requester 154, and at least some portions of repository 115. FIG. 1 also includes one or more input/output devices 120 that allow data to be input and output to and from data processing system 106. It will be understood that data processing system 106 preferably also includes standard software components such as operating systems and the like and further preferably includes standard hardware components not shown in the figure for clarity of example.

Data Structure

Figure 2A:
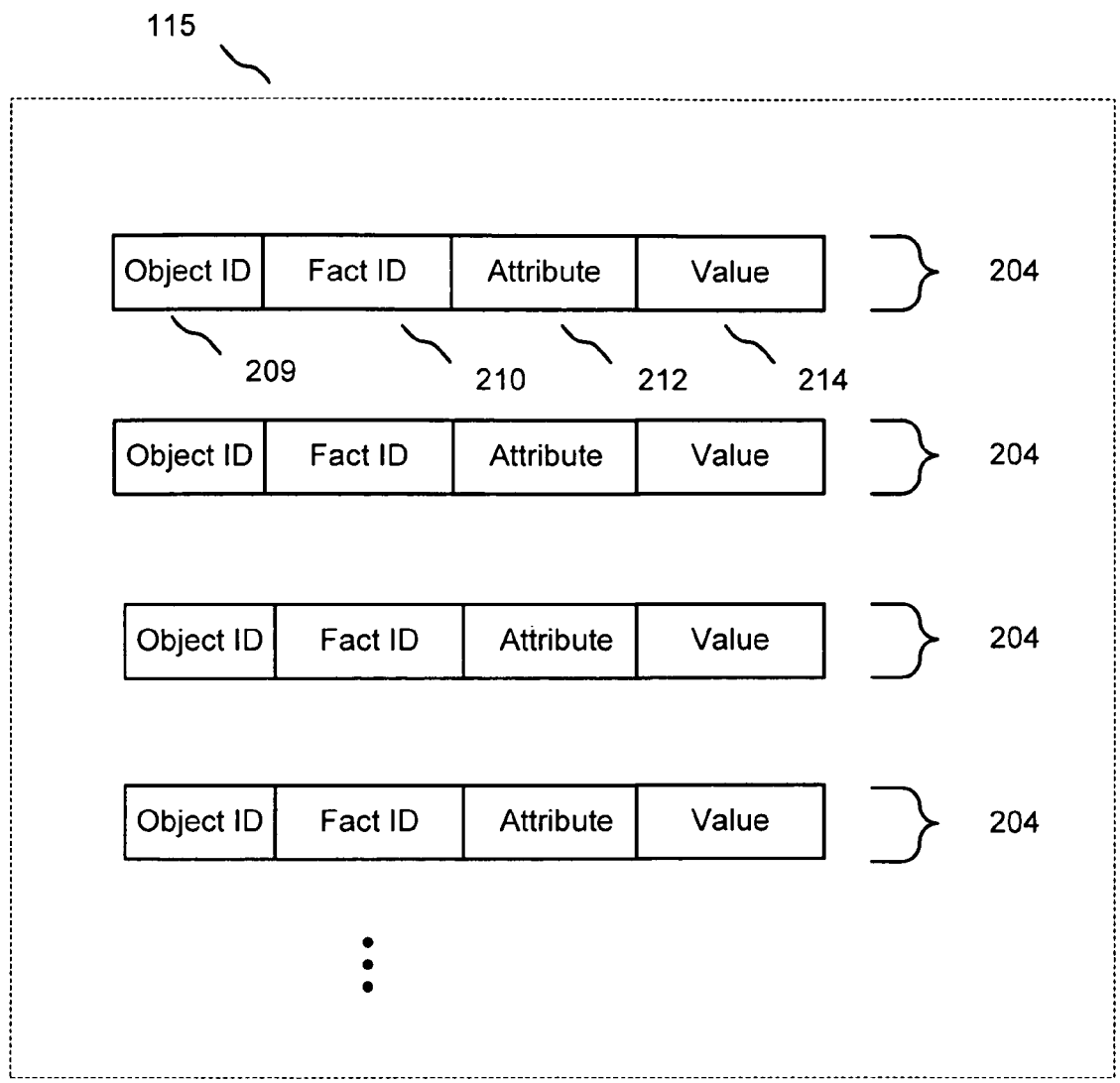
FIGS. 2(a)-2(d) are block diagrams illustrating a data structure for facts within a repository of FIG. 1 in accordance with preferred embodiments of the invention.

FIG. 2(a) shows an example format of a data structure for facts within repository 115, according to some embodiments of the invention. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "Feb. 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

Figure 2B:
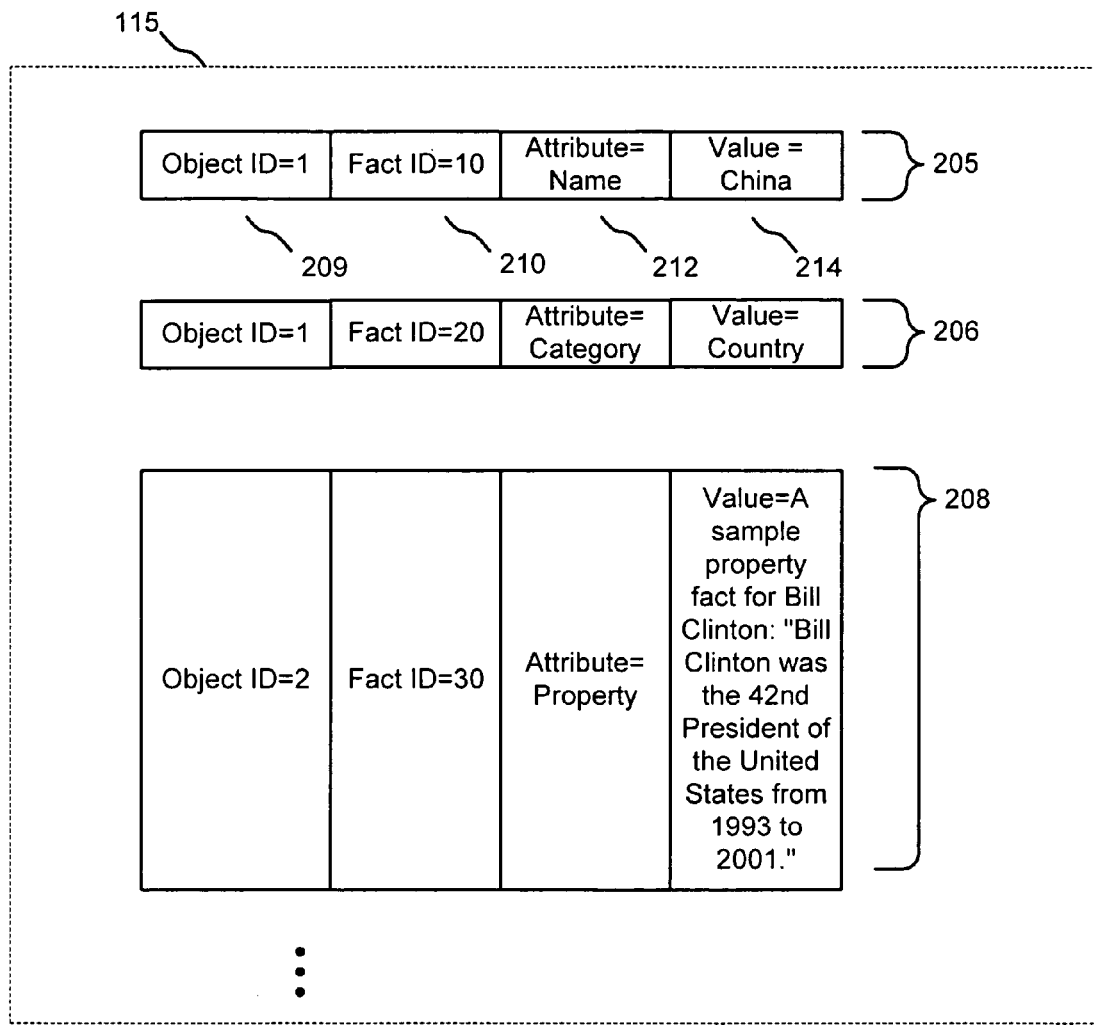

FIG. 2(b) shows an example of facts having respective fact IDs of 10, 20, and 30 in repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of ""Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, perhaps even tables of figures. This content can be formatted, for example, in a markup language. For example, a fact having an attribute "original html" might have a value of the original html text taken from the source web page.

Also, while the illustration of FIG. 2(b) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

Figure 2C:
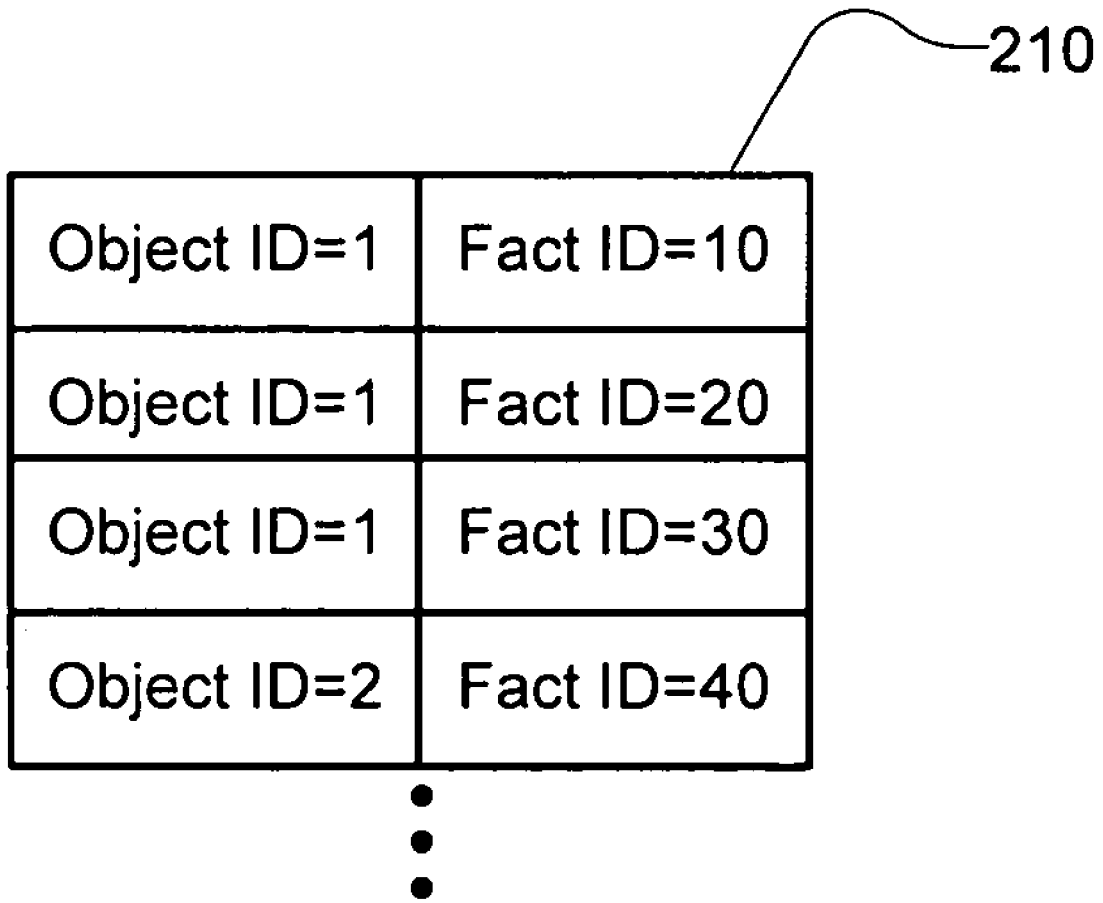

FIG. 2(c) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository to find all facts with a particular object ID. While FIGS. 2(b) and 2(c) illustrate the object reference table 210 with explicit coding of object and fact IDs, the table also may contain just the ID values themselves in column or pair-wise arrangements.

Figure 2D:
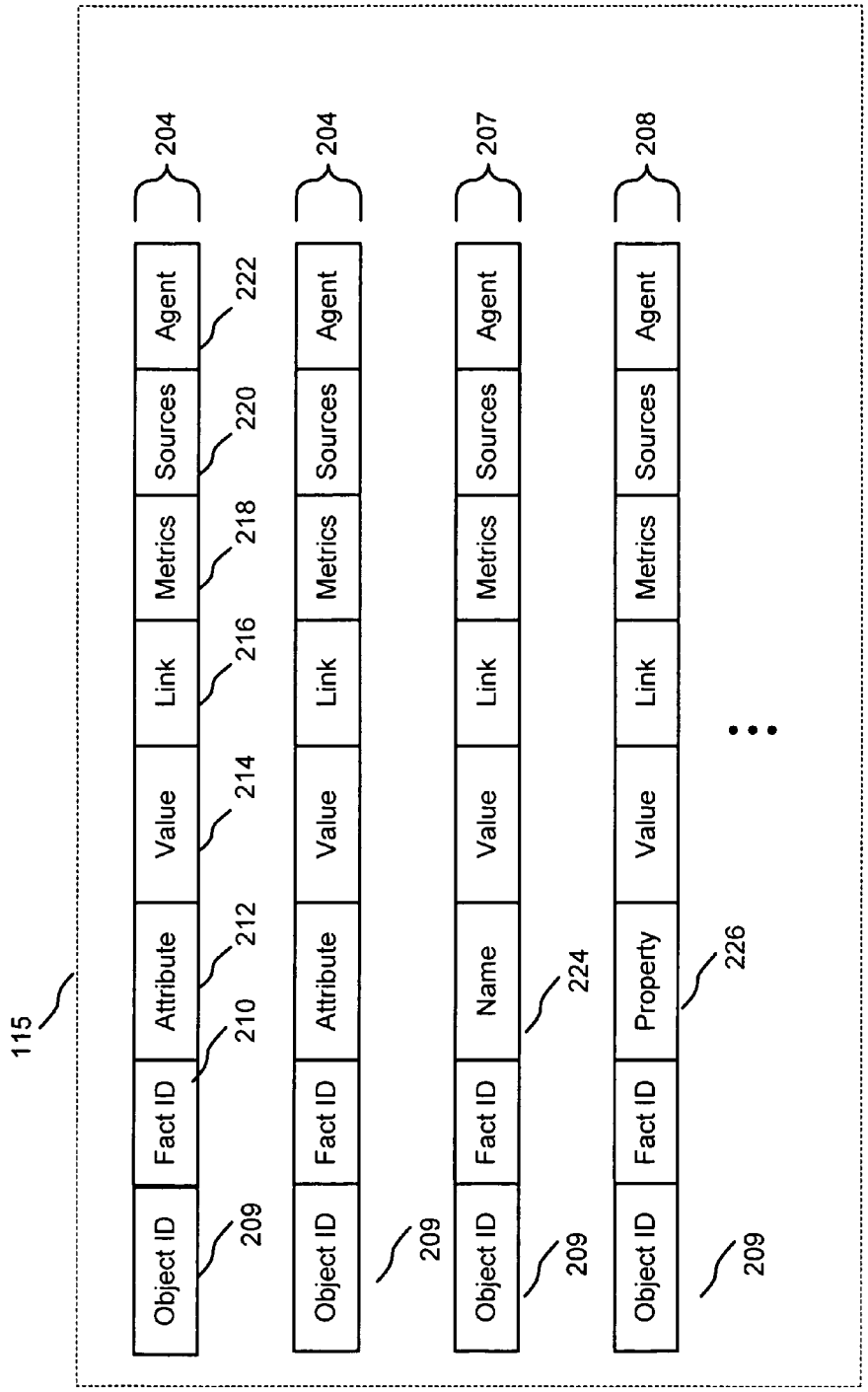

FIG. 2(d) shows an example of a data structure for facts within repository 115, according to some embodiments of the invention showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in repository 115. In some embodiments, the value field 214 stores the name of the linked object and the link 216 stores the object identifier of the linked object. Thus, this "president" fact would include the value 214 of "George W. Bush", and object reference link 216 that contains the object ID for the for "George W. Bush" object. In some other embodiments, facts 204 do not include a link field 216 because the value 214 of a fact 204 may store a link to another object.

Each fact 204 also may include one or more metrics 218. A metric provides an indication of the some quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same parameters (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001." Some object IDs may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general facts records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance to a negative value). However, the facts of the null object are treated as if they were removed from the repository 115. In some other embodiments, facts of null objects are physically removed from repository 115.

Figure 2E:
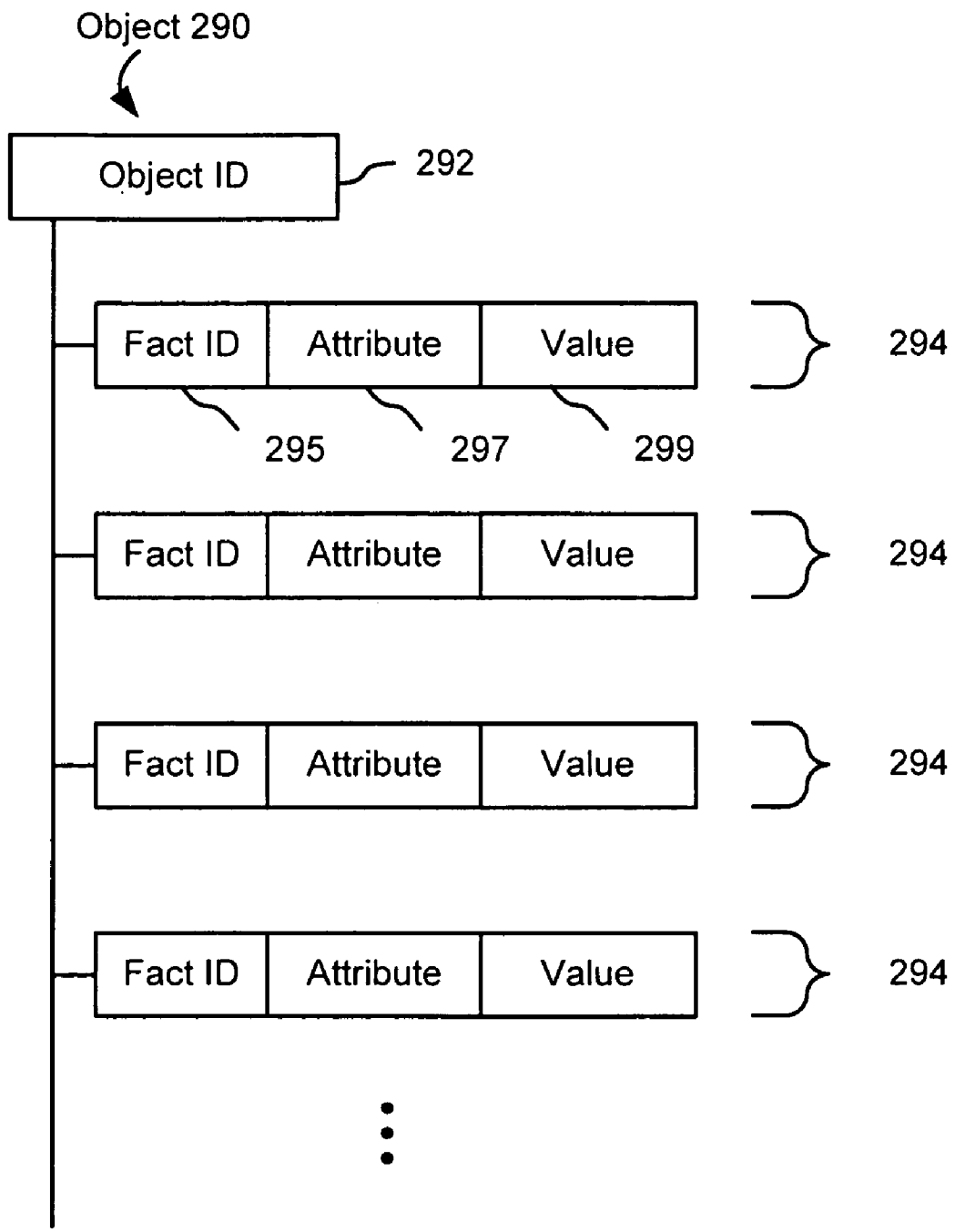
FIG. 2(e) is a block diagram illustrating an alternate data structure for facts and objects in accordance with preferred embodiments of the invention.

FIG. 2(e) is a block diagram illustrating an alternate data structure 290 for facts and objects in accordance with preferred embodiments of the invention. In this data structure, an object 290 contains an object ID 292 and references or points to facts 294. Each fact includes a fact ID 295, an attribute 297, and a value 299. In this embodiment, an object 290 actually exists in memory 107.

Overview of Methodology

Referring now to FIG. 3, there is shown a flow diagram depicting a method for identifying a subject of a target document in accordance with a preferred embodiment of the invention. The steps of the process illustrated in FIG. 3 may be implemented in software, hardware, or a combination of hardware and software.

In one embodiment, the steps of FIG. 3 may be performed by one or more importers 108 as shown in FIG. 1, although one skilled in the art will recognize that the method could be performed by systems having different architectures as well.

The flowchart shown in FIG. 3 will now be described in detail, illustrated by the example in FIGS. 5 and 6(a)-(c). The process commences with a target document. As described above, a document is comprised of any machine-readable data including any combination of text, graphics, multimedia content, etc. A document may be encoded in a markup language, such as Hypertext Markup Language (HTML), i.e., a web page, in an interpreted language (e.g., JavaScript) or in any other computer readable or executable format. A document can include one or more hyperlinks to other documents. A document can have one or more titles.

For example, the target document can be a web page encoded in HTML about reporter Nancy Grace. The target document has a HTML title of "CNN Programs—Anchors/Reporters—Nancy Grace." The Uniform Resource Locator (URL) of the target document is http://www.cnn.com/CNN/anchors_reporters/grace.nancy.html. The Importer 108 receives the target document from a document host 102.

Importer 108 identifies 310 a set of peer documents of the target document. Peer documents are documents from the same or related document hosts 102 as the target document. For example, peer documents can include documents within the same domain as the target document. A domain is a group of computers and devices on the Internet that are identified by a common Internet Protocol (IP) address. All documents from a computer or a device identified by the same IP address are said to be from the same domain. A document host 102 can host documents from different domains. Likewise, documents from the same domain can be hosted in different document hosts 102. Peer documents can include the target document itself. For example, assuming the target document is an article from a document host 102 designated for documents published in IEEE's official website, the peer documents can be all documents from that document host 102, including the target document. It is noted that the identified set of peer documents can contain merely one peer document.

Figure 5:
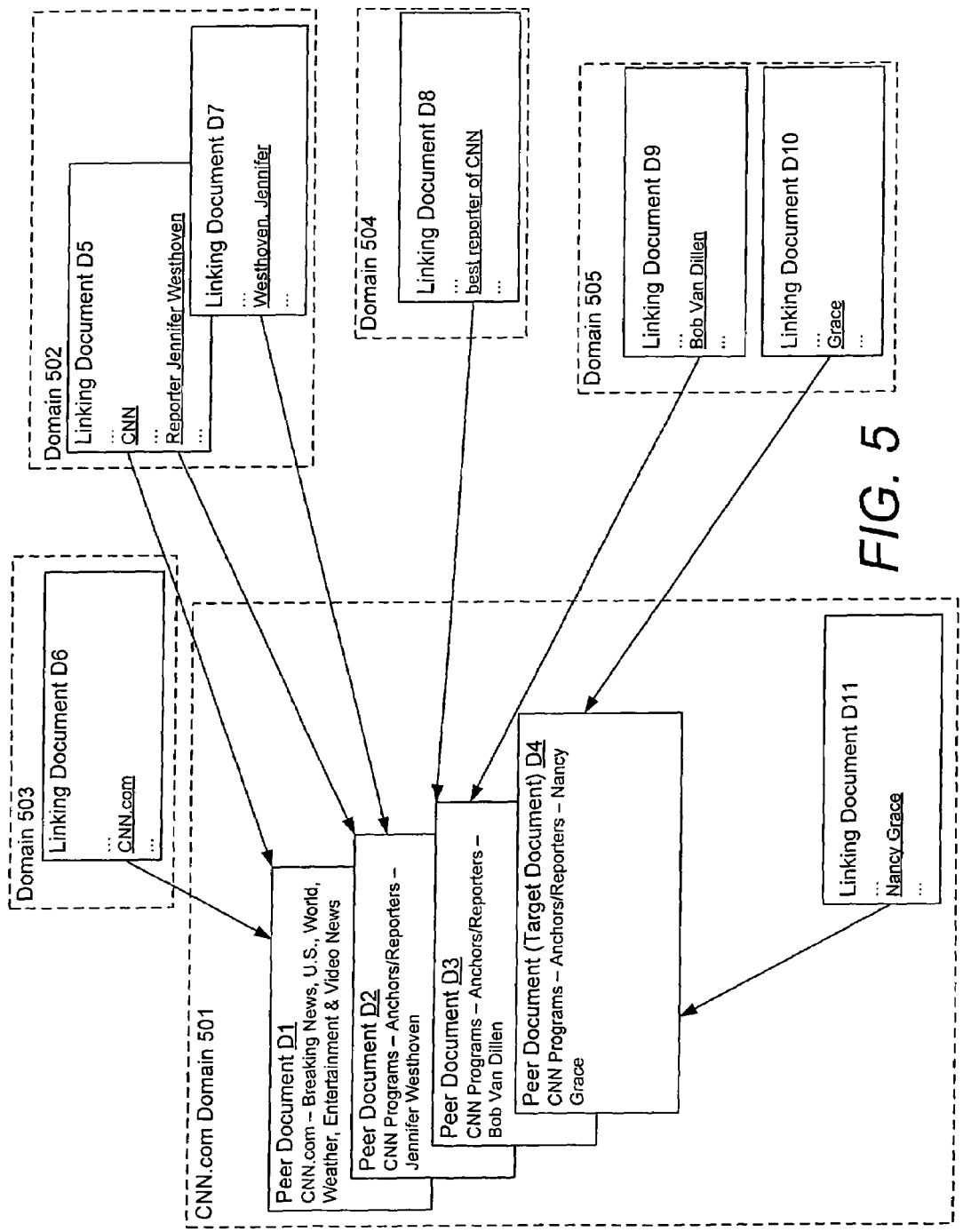

Continuing with the above example of the target document entitled "CNN Programs—Anchors/Reporters—Nancy Grace," importer 108 identifies 310 documents from the CNN.com website as the set of peer documents illustrated in FIGS. 5 and 6(a).

As illustrated in FIG. 5, documents D1-D4 are all from the CNN.com domain 501. Now referring to FIG. 6(a), document D1 is the welcome page of the CNN.com website. D1 serves as a portal page for the website, providing links to other documents from the same domain. Documents D2-D4 are articles covering different subjects. D4 is the target document.

For each of the identified set of peer documents, importer 108 generates 320 a label representing the subject of the peer document. The process for importer 108 to generate 320 a label is further illustrated in the flowchart shown in FIG. 4.

The label generation process starts when importer 108 identifies 410 a set of linking documents for each peer document. As described above, a document can include one or more hyperlinks to other documents. Importer 108 identifies a set of linking documents for a peer document, each linking document containing a hyperlink to the peer document. The set of linking documents are from one or more domains and were originally stored in one or more document hosts 102. A linking document may include content such as text, graphics, multimedia, etc. A linking document may also include hyperlinks to documents other than to the peer document. However, the hyperlink that is of interest to importer 108 is the hyperlink to the peer document.

A hyperlink includes a starting anchor tag, which includes one or more parameters (or markup attributes), and an ending anchor tag. The starting and ending anchor tags define the hyperlink. A hypertext reference attribute is a markup attribute. The hypertext reference attribute indicates that the associated value is the address of the destination of the hyperlink. The text between the starting anchor tag and the ending anchor tag is called anchor text of the hyperlink. The anchor text, if clicked by a user, triggers a request (e.g., an HTTP request) for the document located at the address of the destination of the hyperlink. One example of a hyperlink is <a href="http://www.cnn.com/">CNN</a>

In the example above, <a href="http://www.cnn.com/"> is the starting anchor tag, CNN is the anchor text, and </a> is the ending anchor tag. In the starting anchor tag, href is the hypertext reference attribute and "http:/www.cnn.com/" is the associated value and the address of the destination of the hyperlink. It is noted that methods of linking documents other than using hyperlinks can also be used and the described process can be readily applied to these other methods. Some of the anchor texts includes additional tags such as <b>, <strong>, <font>, etc. These additional tags can be used to display the anchor text in some specific formats as indicated by these tags. In some embodiments, importer 108 ignores such additional tags for purpose of generating 320 the label for the peer documents. In some other embodiments, importer 108 does not ignore such additional tags and put them in the label generated 320 for the peer document.

Continuing with the above example of the target document about Ms. Nancy Grace, importer 108 identifies 410 a set of linking documents for each of documents D1-D4 as shown in FIGS. 5 and 6(b).

Referring to FIG. 6(b), the column labeled "Linking Document ID" (linking document column) contains the document identifier of linking documents identified 410 by importer 108. The column labeled "Peer Document ID" (peer document column) contains the document identifier of the peer document associated with the linking document as identified in the linking document column. The column "Peer Document Title" contains the title of the associated peer document. The column "Anchor Text" contains the anchor text of the hyperlink in the associated linking document linking to the peer document. As shown in FIG. 6(b), importer 108 identifies 410 a set of linking documents including documents D5 and D6 for D1, a set including D5 and D7 for D2, a set including D8 and D9 for D3, and a set including D10 and D11 for D4. It is note that document D5 is identified as a linking document for both peer documents D1 and D2. As illustrated in FIG. 5, linking documents D6 is from domain 503, D5 and D7 are from domain 502, D8 is from domain 504, D9 and D10 are from domain 505, and D11 is from the same domain as peer documents D1-D4, CNN.com domain 501.

Importer 108 generates 420 a label for each peer document based on the title of the peer document and the anchor texts of the associated linking documents. The label is intended to represent the subject of the peer document. As described above, anchor text is the text between the starting anchor tag and the ending anchor tag of the associated hyperlink. In other words, the anchor text is the text in the linking document that is clicked on by the user. The anchor text may be of any length. Because the anchor text is text that is to be rendered for presentation to a user, it may be rendered by the client application differently from other text rendered for presentation to the user, in order to differentiate the hyperlink anchor text from normal text. For example, the anchor text may be underlined and/or have a different font color than normal text after rendering. The hyperlink, if clicked by a user, triggers a request (e.g., an HTTP request) for the source document.

A linking document may contain hyperlinks to several different documents. For example, linking document D5 contains hyperlinks to both peer documents D1 and D2. Because the label to be generated 420 is intended to represent the subject of the peer document, the anchor text of interest to importer 108 is the anchor text associated with the hyperlink to the peer document.

In one embodiment, importer 108 identifies a longest-match anchor text for each peer document and chooses the longest-match anchor text as the label of the associated peer document. A match anchor text is an anchor text that is also a substring of the title of the associated peer document. A substring is a contiguous sequence of characters taken from a string. The longest-match anchor text is the match anchor text that is the longest among all match anchor texts of an associated peer document. For example, the anchor text of linking document D11 is a match anchor text of peer document D4 because the anchor text of D11 (Nancy Grace) is a substring of the title of D4 (CNN Programs—Anchors/Reporters—Nancy Grace). Similarly, the anchor text of D10 (Grace) is also a match anchor text of D4. The longest-match anchor text of peer document D4 is Nancy Grace because Nancy-Grace is longer than Grace.

The longest-match anchor text tends to represent the subject of the associated peer document. The anchor text tends to reflect the subject of the peer document because the author of the linking document associates it with a hyperlink to the peer document such that users can view the peer document by clicking the anchor text. Likewise, the title of the peer document tends to reflect the subject of the peer document because generally a title is used to reflect the subject of the associated document. It follows that a match anchor text, the anchor text that overlaps with the title of the peer document, tends to reflect the subject of the peer document. For example, there could be anchor text "Click here to see the reporter" or "Best reporter of the week." Because such anchor texts are not match anchor texts, importer 108 ignores them when generate 420 the label. By matching anchor text with document title, it is more likely to get the correct anchor text describing the document subject. The longest-match anchor text, therefore, tends to be the most specific description of the subject of the peer document.

In another embodiment, importer 108 identifies common prefix and suffix among titles of peer documents and generates a condensed title for each peer document by removing the common prefix and suffix from the title. Because common prefix and suffix tend not to be related to the subjects of peer documents, the condensed title tends to include less information unrelated to the subject comparing to the title. By doing so, anchor texts unrelated to the subject of the peer document are not used by importer 108 to generate label. For example, the common prefix of documents D1-D4 is "CNN." The anchor text of a linking document associated with D3 may be simply CNN. This anchor text (CNN) is a substring of the title of D3 (CNN Programs—Anchors/Reporters—Bob Van Dillen). Therefore, the anchor text CNN is a match anchor text, even though it is not related to the subject of D3, reporter Bob Van Dillen. Assuming importer 108 generates a condensed title for D3 by removing the common prefix from the title, the anchor text CNN is not a substring of the condensed title of D3 (Programs—Anchors/Reporters—Bob Van Dillen), and importer 108 therefore will not use the anchor text CNN to generate 420 the label. Similarly, importer 108 can remove domain related information from the title of the peer document and the anchor text of linking documents before identifying longest-match anchor text. For example, importer 108 can remove the domain name string "CNN.com" from titles of peer documents D1-D4 and anchor texts of linking documents D5-D11 before generating 420 a label for each peer document.

In yet another embodiment, instead of choosing the longest-match anchor text, for each linking document, importer 108 identifies a longest-match string of the anchor text of the linking document and the title of the associated peer document. Importer 108 then chooses the longest longest-match string among the associated linking documents as the label of the peer document. A match string of two strings A and B is a string that is contained in both string A and string B. A longest-match string is the longest match string among all the match strings. For example, the longest-match string between the title of D2 (CNN Programs—Anchors/Reporters—Jennifer Westhoven) and the corresponding anchor text of D5 (Reporter Jennifer Westhoven) is Jennifer Westhoven; and the longest-match string between the title of D2 and the anchor text of D7 (Westhoven, Jennifer) is Westhoven. The longest longest-match string among the above two longest-strings is Jennifer Westhoven, not Westhoven. Therefore, importer 108 uses Jennifer Westhoven as the label.

In another embodiment, importer 108 chooses the match anchor text that is associated with the most linking documents as the label of the peer document. For example, if the longest-match anchor text of one linking document is Reporters—Bob Van Dillen and the match anchor text of three linking documents are Bob Van Dillen, importer 108 chooses Bob Van Dillen as the label of the associated peer document, even though it is not the longest-match anchor text. Alternatively, importer 108 may choose a match anchor text which is neither the longest nor the one associated with the most linking documents as the label of the peer document.

It is noted that in alternative embodiments, importer 108 may apply some normalization rules to the title of the peer document and/or the anchor text to standardize the format before comparing for the longest-match anchor text. Examples of the normalization rules include removal of punctuation, such as removing commas in a string, conversion of uppercase characters in a string to corresponding lowercase characters, such as from "America" to "america," and stop word removal, such as removing stop words such as "the" and "of" from a string. For example, after applying the above normalization rules, the title of D3 becomes "cnn programs anchorsreporters bob van dillen" and the anchor text of D8 becomes "best reporter cnn."

In case a peer document has no linking document identified, importer 108 can choose not to generate 420 a label for it. Similarly, if a peer document does not have a title, importer 108 can choose not to generate 420 a label for it. In case the anchor text of a linking document includes non-textual contents such as pictures or videos, the peer document can choose to ignore the non-textual content or the linking document for the purpose of generating 420 a label for the peer document. Also, if the longest-match anchor text is meaningless (e.g., stop words such as "the" or strings that are too short to reflect the subject of the peer document), importer 108 does not generate 420 a label for the peer document.

Continuing with the above example of the target document about Ms. Nancy Grace, importer 108 generates 420 a label for each of the peer documents D1-D4 as shown in FIG. 6(*c*).

Referring to FIG. 6(*c*), the title of D1 is CNN.com—Breaking News, U.S., World, Weather, Entertainment & Video News. The anchor text of D5 (CNN) is a match anchor text of D1. The anchor text of D6 (CNN.com) is also a match anchor text of D1. Importer 108 chooses CNN.com as the label of peer document D1 because it is the longest-match anchor text. Similarly, the label of D3 is the anchor text of D9—Bob Van Dillen; and the label of D4 is the anchor text of D11—Nancy Grace. Importer 108 does not generate a label for D2 because neither anchor texts of the linking documents D5 (Reporter Jennifer Westhoven) and D7 (Westhoven, Jennifer) is a match anchor text.

Referring back to FIG. 3, importer 108 identifies 330 one or more general patterns between the labels and the titles of the peer documents. Because the label is intended to represent the subject of the peer document, the general pattern between the label and the title tends to be the general pattern between the subject and the title. One purpose to identify 330 such general patterns is to isolate the information in the title unrelated to the subject of the peer document. For example, for the title of D3 (CNN Programs—Anchors/Reporters—Bob Van Dillen), a prefix (CNN Programs—Anchors/Reporters—) serves to identify the publisher, which is not related to the subject of D3, Mr. Bob Van Dillen.

Another purpose to identify 330 one or more general patterns is to filter out some labels unrelated to the subjects of the associated peer documents. For example, the longest-match anchor text of some peer documents may be unrelated to the subjects of the peer documents. This is especially problematic for the unpopular peer documents that only have very few linking documents. For example, a document with a title CNN Programs—Anchors/Reporters—Regular Joe may only has one linking document with the anchor text Reporter. Because the anchor text Reporter is the longest-match anchor text, importer 108 generates 420 a label Reporter for the document. Subsequently, importer 108 would recognize "CNN Programs—Anchors/" as prefix and "s—Regular Joe" as suffix. By aggregating the individual patterns between the label and the title of each peer documents and identifying 330 one or more general patterns, importer 108 can ignore the above erroneous individual pattern and identify 330 the general patterns that correctly represent the patterns between the subject and the title of a majority of the peer documents.

In one embodiment, importer 108 compares the label and the title of a peer document to identify a prefix and a suffix in the title. Because the label is the longest-match anchor text of the peer document, the label is a substring of the title of the peer document. For example, for peer document D3, the prefix is CNN Programs—Anchors/Reporters—, and there is no suffix. Based on the identified prefix and suffix, importer 108 identifies an individual pattern between the title and label of the peer document. The individual pattern of the title and label of peer document D3 can be expressed as "% CNN Programs—Anchors/Reporters—% & & % %," where % CNN Programs—Anchors/Reporters—% represents the prefix, && represents the label, and % % represents an empty suffix. In some embodiments, importer 108 can recognize dynamic prefix/suffix. For example, for a document title CNN.com—Robot walks, balances like a human—Apr. 19, 2005 and a label Robot walks, balances like a human importer 108 can recognize that Apr. 19, 2005 is a date and expresses the above patter as "% CNN.com—% && %—mmm dd, yyyy %," where mmm stands for three-character abbreviation of month, dd stands for two-digit day, and yyyy stands for four-digit year.

Continuing with the above example of the target document about Ms. Nancy Grace, importer 108 identifies an individual pattern for each of the peer documents D1, D3 and D4 as shown in FIG. 6(*c*).

Referring to FIG. 6(*c*), importer 108 identifies no prefix and a suffix of "—Breaking News, U.S., World, Weather, Entertainment & Video News" for the individual pattern of D1 because the label of D1 is CNN.com. The individual patterns identified for D3 and D4 are both % CNN Programs—Anchors/Reporters—% && % %. Importer 108 does not identify an individual pattern for D2 because no label is generated for D2.

After importer 108 identifies an individual pattern for each peer document, it identifies 330 one or more general patterns by choosing individual patterns that occur above a threshold. The threshold can be user-defined or dynamically modified by importer 108. Alternatively, importer 108 can give more weight to certain individual patterns, such as individual patterns identified based on reputable labels (e.g., labels generated from linking document from reputable websites). In some other embodiments, importer 108 groups similar individual patterns into groups, and chooses individual patterns from groups exceeding certain size as the general patterns. Importer 108 can identify 330 zero, one, or more general patterns.

Continuing with the above example of the target document about Ms. Nancy Grace, it is assumed here that importer 108 uses a dynamic threshold and identifies those individual patterns with occurrences exceeding one third of the total number of peer documents as general patterns. Because in the example there are four peer documents, the threshold is approximately 1.33. Importer 108 identifies 330 one general pattern % CNN Programs—Anchors/Reporters—% && % % because it has two occurrences, exceeding the threshold of 1.33. It is noted that the threshold can be a fixed value (e.g., 50). When importer 108 deals with a large set of peer documents, the threshold probably will be much higher than 1.33. For example, when the set includes more than a thousand peer documents, the threshold can be as high as 50.

Importer 108 identifies 340 a subject of the target document based on the identified general patterns and the title of the target document. Because each identified general pattern represents a popular pattern between labels and titles of the peer documents and the label is intended to represent the subject of the associated peer document, the title and the subject of the target document tend to have one of such general patterns. Importer 108 identifies a general pattern that is applicable to the title of the target document and identifies 340 the subject based on the applicable general pattern and the title. Note that even if the target document does not have any linking documents, importer 108 can still properly identify the subject by applying an applicable general pattern.

In case none of the identified general patterns is applicable to the title of the target document, importer 108 can determine that the target document does not have a subject. Alternatively, importer 108 can apply some traditional methods to determine the subject of the document, such as using the title or anchor text of the document as the subject. In another embodiment, if none of the identified general patterns is applicable, importer 108 repeats the above process to identify a different set of general patterns, and uses the different set general patterns to identify the subject of the target document.

In case more than one of the identified general patterns are applicable to the title of the target document, importer 108 can choose to apply the general pattern that generates the longest description of the subject.

Continuing with the above example of the target document about Ms. Nancy Grace, importer 108 identifies the subject of the target document D4 by applying the identified general pattern (% CNN Programs—Anchors/Reporters—% && % %) to the title of D4 (CNN Programs—Anchors/Reporters—Nancy Grace). The identified subject is Nancy Grace.

It is noted that the described invention can also be applied to determine the name of the entity described by the target document. If a document describes an entity, the subject of the document is the name of the entity. By determining the subject of the document, this invention also determines the name of the entity described by the document. What is more, if a document does not describe an entity, the above identified general patterns tend not to be applicable to the title of the document. Therefore, by determining that none of the identified general patterns is applicable to the title of a document, importer 108 can determine that the document does not describe an entity. For example, because the identified general pattern is not applicable to D1, importer 108 can properly determine that D1 does not describe an entity.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of determining the subject of a target document, comprising: using a computer processor to perform:
    (a) identifying a plurality of peer documents within the same domain as the target document, each of the plurality of peer documents being associated with the target document and being stored in a computer memory;
    (b) for each of the plurality of peer documents,
        (i) identifying a plurality of linking documents having links that link to the peer document, each link having an anchor text,
        (ii) identifying a plurality of linking documents having links that link to the peer document, each link having an anchor text, and
        (iii) identifying a first pattern common to the title of the peer document and the selected anchor text;
    (c) identifying a second pattern from the first patterns associated with the plurality of peer documents by identifying the second pattern from the first patterns associated with the plurality of peer documents based at least in part on the number of peer documents associated with the first patterns; and
    (d) identifying a subject for the target document based on the second pattern and a title of the target document.

2. The method of claim 1, wherein selecting the anchor text further comprises:
    for each of the plurality of linking documents, determining whether the anchor text of the linking document is a substring of a title of the peer document; and
    selecting the anchor text from one of the plurality of linking documents that is a longest substring of a title of the peer document.

3. The method of claim 1, wherein identifying a second pattern comprises identifying the second pattern from the first patterns associated with the plurality of peer documents, the second pattern being associated with a collection of peer documents, the size of the collection exceeding a threshold.

4. The method of claim 1, wherein identifying a first pattern comprises:
    identifying a prefix or a suffix in the title of the peer document; and
    identifying the first pattern common to the title of the peer document and the selected anchor text based at least in part on the prefix or the suffix.

5. The method of claim 1, wherein identifying a subject comprises:
    responding to the second pattern being applicable to a title of the target document, identifying a subject for the target document based on the second pattern and the title of the target document; and
    responding to the second pattern being not applicable to the title of the target document, determining that the target document does not have a subject.

6. The method of claim 1, wherein the target document is a webpage.

7. The method of claim 1, wherein each of the plurality of peer documents is from the same domain as the target document.

8. The method of claim 1, wherein at least one linking documents links to the corresponding peer document via a hyperlink.

9. The method of claim 1, wherein the subject comprises a name of an entity, the entity being described by the target document.

10. A computer-implemented method of determining the subject of a target document, comprising: using a computer processor to perform:
    (a) identifying a plurality of peer documents within the same domain as the target document, each of the plurality of peer documents being associated with the target document and being stored in a computer memory;
    (b) for each of the plurality of peer documents,
        (i) identifying a plurality of linking documents having links that link to the peer document, each link having an anchor text,
        (ii) selecting the anchor text from one of the plurality of linking documents based on a title of the peer document, and
        (iii) identifying a pattern based on the title of the peer document and the selected anchor text; and
    (c) identifying one or more second patterns from the patterns associated with the plurality of peer documents;
    (d) identifying one of the one or more second patterns, the identified second pattern being applicable to a title of the target document, by identifying the one or more second patterns from the patterns associated with the plurality of peer documents based at least in Dart on the number of peer documents associated with the patterns; and
    (e) identifying a subject for the target document based on the identified second pattern and the title of the target document.

11. A system for determining the subject of a target document, the system comprising:
    a processor for executing programs; and
    a subsystem executable by the processor, the subsystem including:

(a) instructions for identifying a plurality of peer documents within the same domain as the target document, each of the plurality of peer documents being associated with the target document;
(b) for each of the plurality of peer documents,
  (i) instructions for identifying a plurality of linking documents having links that link to the peer document, each link having an anchor text,
  (ii) instructions for selecting the anchor text from one of the plurality of linking documents that is a longest substring of a title of the peer document, and
  (iii) instructions for identifying a first pattern common to the title of the peer document and the selected anchor text;
(c) Instructions for identifying a second pattern from the first patterns associated with the plurality of peer documents by identifying the second pattern from the first patterns associated with the plurality of peer documents based at least in part on the number of peer documents associated with the first patterns; and
(d) instructions for identifying a subject for the target document based on the second pattern and a title of the target document.

12. A system for determining the subject of a target document, the system comprising: a processor for executing programs; and a subsystem executable by the processor, the subsystem including:
(a) instructions for identifying a plurality of peer documents within the same domain as the target document, each of the plurality of peer documents being associated with the target document;
(b) for each of the plurality of peer documents,
  (i) instructions for identifying a plurality of linking documents having links that link to the peer document, each link having an anchor text,
  (ii) instructions for selecting the anchor text from one of the plurality of linking documents based on a title of the peer document, and
  (iii) instructions for identifying a pattern based on the title of the peer document and the selected anchor text; and
(c) instructions for identifying one or more second patterns from the patterns associated with the plurality of peer documents;
(d) instructions for identifying one of the one or more second patterns, the identified second pattern being applicable to a title of the target document, by identifying the one or more second patterns from the patterns associated with the plurality of peer documents based at least in part on the number of peer documents associated with the patterns; and
(e) instructions for identifying a subject for the target document based on the identified second pattern and the title of the target document.

13. A computer program product for use in conjunction with a computer system, the computer program product comprising a computer readable storage medium and a computer program mechanism embedded therein, the computer program mechanism including:

(a) instructions for identifying a plurality of peer documents within the same domain as the target document, each of the plurality of peer documents being associated with the target document;
(b) for each of the plurality of peer documents,
  (i) instructions for identifying a plurality of linking documents having links that link to the peer document, each link having an anchor text,
  (ii) instructions for selecting the anchor text from one of the plurality of linking documents that is a longest substring of a title of the peer document, and
  (iii) instructions for identifying a first pattern common to the title of the peer document and the selected anchor text;
(c) instructions for identifying a second pattern from the first patterns associated with the plurality of peer documents by identifying the second pattern from the first patterns associated with the plurality of peer documents based at least in part on the number of peer documents associated with the first patterns; and
(d) instructions for identifying a subject for the target document based on the second pattern and a title of the target document.

14. A computer program product for use in conjunction with a computer system, the computer program product comprising a computer readable storage medium and a computer program mechanism embedded therein, the computer program mechanism including:
(a) instructions for identifying a plurality of peer documents within the same domain as the target document, each of the plurality of peer documents being associated with the target document;
(b) for each of the plurality of peer documents,
  (i) instructions for identifying a plurality of linking documents having links that link to the peer document, each link having an anchor text,
  (ii) instructions for selecting the anchor text from one of the plurality of linking documents based on a title of the peer document, and
  (iii) instructions for identifying a pattern based on the title of the peer document and the selected anchor text; and
(c) instructions for identifying one or more second patterns from the patterns associated with the plurality of peer documents;
(d) instructions for identifying one of the one or more second patterns, the identified second pattern being applicable to a title of the target document, by identifying the one or more second patterns from the patterns associated with the plurality of peer documents based at least in part on the number of peer documents associated with the patterns; and
(e) instructions for identifying a subject for the target document based on the identified second pattern and the title of the target document.

\* \* \* \* \*

UNITED STATES PATENT AND TRADEMARK OFFICE
CERTIFICATE OF CORRECTION

PATENT NO. : 7,590,628 B2  
APPLICATION NO. : 11/394610  
DATED : September 15, 2009  
INVENTOR(S) : Shubin Zhao It is certified that error appears in the above-identified patent and that said Letters Patent is hereby corrected as shown below:

Column 16, line 57, please delete "Dart" and insert -- part --.

Signed and Sealed this

Seventeenth Day of November, 2009

David J. Kappos  
*Director of the United States Patent and Trademark Office*